US010876477B2

(12) United States Patent
Prociw et al.

(10) Patent No.: US 10,876,477 B2
(45) Date of Patent: Dec. 29, 2020

(54) NOZZLES WITH INTERNAL MANIFOLDING

(71) Applicant: Delavan Inc, West Des Moines, IA (US)

(72) Inventors: Lev Alexander Prociw, Johnston, IA (US); Jason A. Ryon, Carlisle, IA (US)

(73) Assignee: Delavan Inc, West Des Moines, IA (US)

(*) Notice: Subject to any disclaimer, the term of this patent is extended or adjusted under 35 U.S.C. 154(b) by 0 days.

(21) Appl. No.: 15/268,211

(22) Filed: Sep. 16, 2016

(65) Prior Publication Data

US 2018/0080384 A1   Mar. 22, 2018

(51) Int. Cl.
| | |
|---|---|
| *B05B 1/34* | (2006.01) |
| *F02C 7/22* | (2006.01) |
| *F23R 3/28* | (2006.01) |
| *F23D 14/78* | (2006.01) |
| *B05B 7/10* | (2006.01) |

(52) U.S. Cl.
CPC .............. *F02C 7/222* (2013.01); *B05B 1/341* (2013.01); *B05B 7/10* (2013.01); *F23D 14/78* (2013.01); *F23R 3/283* (2013.01); *F05D 2220/32* (2013.01)

(58) Field of Classification Search
CPC . B05B 1/341; B05B 7/10; F02C 7/222; F23R 3/283; F23D 14/78; F05D 2220/32
USPC .......................................................... 239/461
See application file for complete search history.

(56) References Cited

U.S. PATENT DOCUMENTS

| | | | |
|---|---|---|---|
| 2,172,383 A | 9/1939 | Harlan | |
| 3,570,242 A * | 3/1971 | Leonardi et al. | F23R 3/04 431/183 |
| 3,853,273 A * | 12/1974 | Bahr | F23R 3/14 239/402 |
| 3,901,446 A * | 8/1975 | Petreikis, Jr. | F23R 3/14 239/132.5 |
| 4,180,974 A * | 1/1980 | Stenger | F23R 3/14 60/748 |
| 4,653,278 A | 3/1987 | Vinson et al. | |
| 4,842,197 A * | 6/1989 | Simon | F23C 7/002 239/400 |
| 4,887,962 A | 12/1989 | Hasenack et al. | |

(Continued)

FOREIGN PATENT DOCUMENTS

WO   WO-2015/092206 A1   6/2015

OTHER PUBLICATIONS

Extended European Search Report dated Jan. 22, 2018, issued during the prosecution of European Patent Application No. 17191544.0 (8 pages).

(Continued)

*Primary Examiner* — Chee-Chong Lee
(74) *Attorney, Agent, or Firm* — Locke Lord LLP; Joshua L. Jones; Scott D. Wofsy

(57) ABSTRACT

A nozzle includes a nozzle body defining a liquid circuit extending from a liquid inlet to a liquid outlet. The liquid circuit includes a plurality of spiral liquid passages spiraling radially inward relative to a spray axis. The spiral liquid passages all lie in a plane normal to the spray axis. A manifold assembly includes a plurality of such nozzles. A manifold ring is in fluid communication with the liquid inlet of each of the nozzles to deliver liquid to the nozzles. The nozzles are circumferentially spaced apart around the manifold ring.

11 Claims, 5 Drawing Sheets

(56) References Cited

U.S. PATENT DOCUMENTS

| | | | |
|---|---|---|---|
| 5,353,599 A * | 10/1994 | Johnson | F23M 5/085 |
| | | | 60/39.83 |
| 6,003,781 A | 12/1999 | Kwan | |
| 6,247,317 B1 | 6/2001 | Kostka | |
| 6,775,984 B2 | 8/2004 | Lavie et al. | |
| 7,654,088 B2 | 2/2010 | Shafique et al. | |
| 7,891,193 B2 | 2/2011 | Hernandez et al. | |
| 8,074,452 B2 | 12/2011 | Prociw et al. | |
| 8,186,163 B2 | 5/2012 | Hernandez et al. | |
| 8,347,630 B2 | 1/2013 | Lovett et al. | |
| 8,959,772 B2 * | 2/2015 | Hernandez | F23D 11/36 |
| | | | 29/890.124 |
| 9,033,263 B2 | 5/2015 | Rackwitz | |
| 2005/0133642 A1 | 6/2005 | Rackwitz | |
| 2005/0279862 A1 * | 12/2005 | Mao | F23D 11/107 |
| | | | 239/403 |
| 2012/0186083 A1 | 7/2012 | Hernandez et al. | |
| 2012/0186259 A1 | 7/2012 | Hoke | |
| 2012/0228397 A1 | 9/2012 | Thomson | |
| 2014/0318137 A1 | 10/2014 | McMasters et al. | |
| 2014/0339339 A1 | 11/2014 | Prociw | |
| 2015/0014444 A1 * | 1/2015 | Kobayashi | F02M 61/163 |
| | | | 239/461 |

OTHER PUBLICATIONS

Extended European Search Report dated Aug. 1, 2019, issued during the prosecution of European Patent Application No. EP 19183683.2.

* cited by examiner

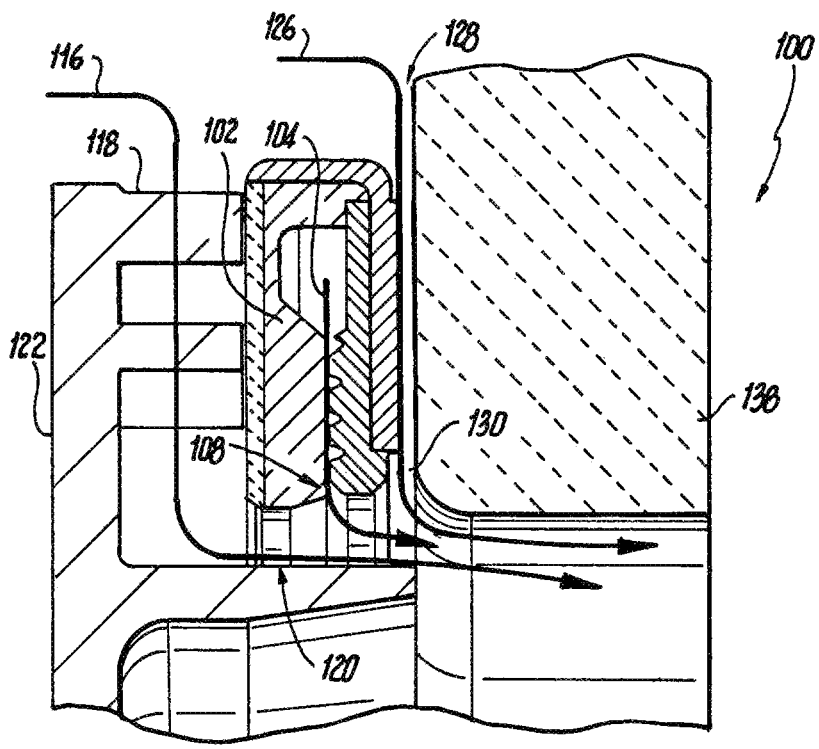
Fig. 8
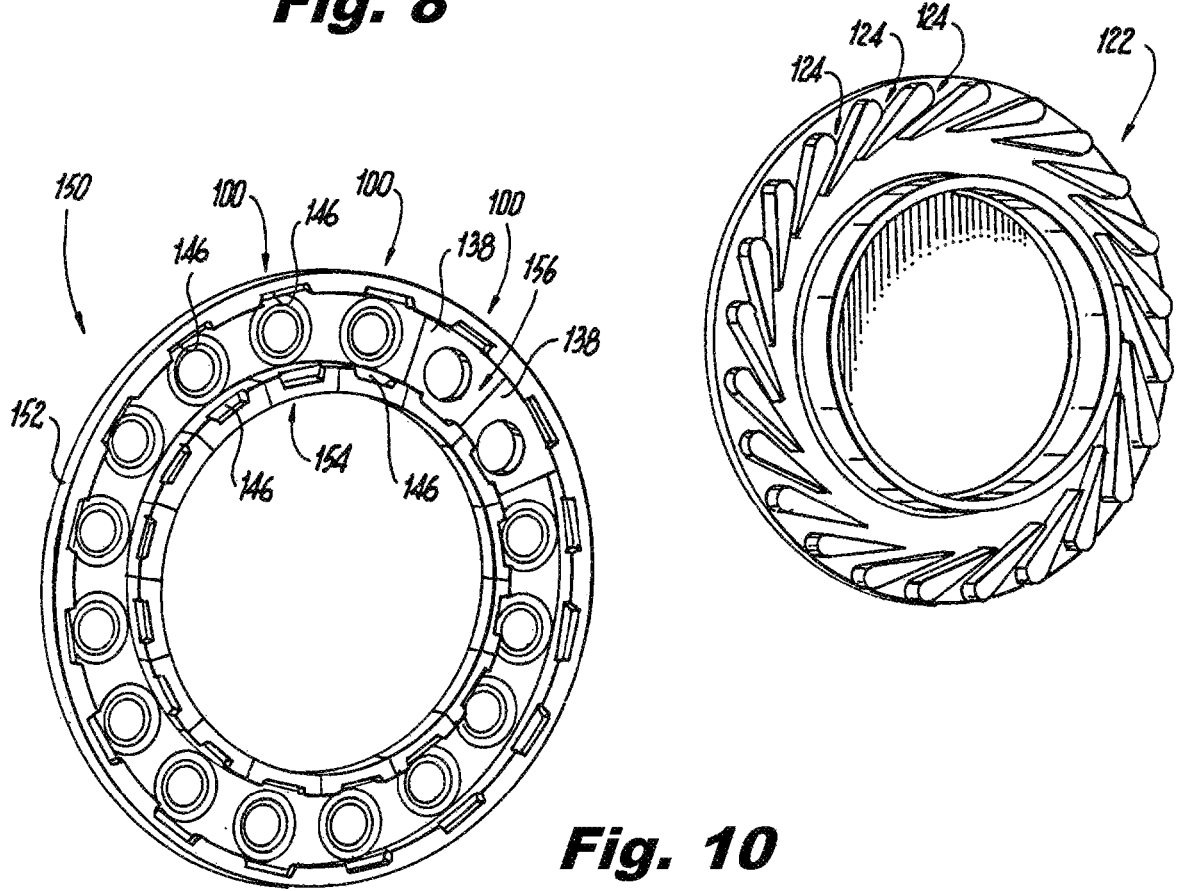
Fig. 9
Fig. 10

NOZZLES WITH INTERNAL MANIFOLDING

BACKGROUND OF THE INVENTION

1. Field of the Invention

The present disclosure relates to nozzles, and more particularly to fuel nozzles such as those used in combustors of gas turbine engines.

2. Description of Related Art

A variety of engines typically incorporate fuel injectors or nozzles in their combustion sections in which fuel and air are mixed and combusted. Efficiency of combustion is related to a variety of factors including fuel-to-air ratio, ignition source location and degree of fuel atomization. Fuel is typically sprayed from a pressure atomizer and then mixed with flows of air.

Conventional fuel nozzles are bulky components and require numerous apertures in their high pressure combustor cases, i.e., where fuel injectors and/or fuel manifolds enter the combustor case. Although conventional fuel nozzles admit a large amount of air into the combustor, more air is usually required to protect the area in the combustor around the nozzle opening, meaning that not all of the air can enter the combustor through the nozzles themselves. Fuel is usually concentrated around conventional nozzles because it is admitted through nozzle components with very small diameters.

Such conventional methods and systems have generally been considered satisfactory for their intended purpose. However, there is an ongoing need in the art for improved fuel nozzles. The present disclosure provides a solution for this need.

SUMMARY OF THE INVENTION

A nozzle includes a nozzle body defining a liquid circuit extending from a liquid inlet to a liquid outlet. The liquid circuit includes one or more spiral liquid passages spiraling radially inward relative to a spray axis. Each of the spiral liquid passages lies in a plane normal to the spray axis.

Each spiral liquid passage can define a respective outlet orifice of the liquid outlet. Each outlet orifice can define an orifice axis that has a tangential component relative to the spray axis and lies in the plane normal to the spray axis.

The nozzle body can include an inner air circuit passing inboard of the liquid outlet. The inner air circuit can extend radially inward from an inlet thereof and turns in an axial direction to an outlet thereof radially inboard of the liquid outlet. A radial air swirler can be mounted to the nozzle body, wherein radial air slots defined in the radial air swirler define an inlet of the inner air circuit. The inner air circuit and liquid circuit can be in a co-swirling configuration.

The nozzle body can include an outer air circuit passing outboard of the liquid outlet. The outer air circuit can extend radially inward from an inlet thereof and can turn in an axial direction to an outlet thereof radially outboard of the liquid outlet. The nozzle body can include a plurality of spacers extending from an annular face of the nozzle body in a parallel direction to the spray axis. A heat shield can be mounted to the nozzle body, spaced apart from the nozzle body by the spacers, wherein the outer air circuit is defined between the nozzle body, spacers, and heat shield. The spacers can define a non-tangential flow path for non-swirling issue of air through the outer air circuit.

The nozzle body can include inner and outer manifold ring segments, wherein at least one of the ring segments includes a liquid manifold passage in fluid communication with the liquid inlet of the liquid circuit. At least one of the ring segments can include a bayonet feature configured to receive a corresponding bayonet feature of a combustor wall or combustor sliding support.

A manifold assembly includes a plurality of nozzles as described above. A manifold ring is in fluid communication with the liquid inlet of each of the nozzles to deliver liquid to the nozzles. The nozzles are circumferentially spaced apart around the manifold ring.

The manifold ring can be a first manifold ring, and the assembly can include a second manifold ring, wherein the fuel nozzles extend radially between the first and second manifold rings. Each manifold ring can include bayonet features, wherein the bayonet features of each manifold ring are interlocked with a bayonet feature of a combustor wall or combustor sliding support.

Each of the nozzles can include a heat shield mounted to a downstream face thereof, wherein the heat shields define an upstream combustor dome wall. Each nozzle can include an inner air circuit passing inboard of the liquid outlet and an outer air circuit passing outboard of the liquid outlet, wherein the inner and outer air circuits are the only pathway for air to pass through the combustor dome wall.

A method of assembling a liquid circuit includes abutting a liquid swirler with at least one groove defined therein against a nozzle body so the at least one groove forms a spiral liquid passage that spirals radially inward relative to a spray axis, each of the at least one spiral liquid passages laying in a plane normal to the spray axis.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 8 is a cross-sectional elevation view of a portion of the nozzle of FIG. 1, schematically showing the inner air circuit, liquid circuit, and outer air circuit;

FIG. 9 is perspective view of the radial air swirler of FIG. 4, showing the radial swirl slots;

FIG. 10 is a perspective view of a plurality of nozzles of FIG. 1 assembled into a manifold assembly.

DETAILED DESCRIPTION OF THE PREFERRED EMBODIMENTS

Figure 1:
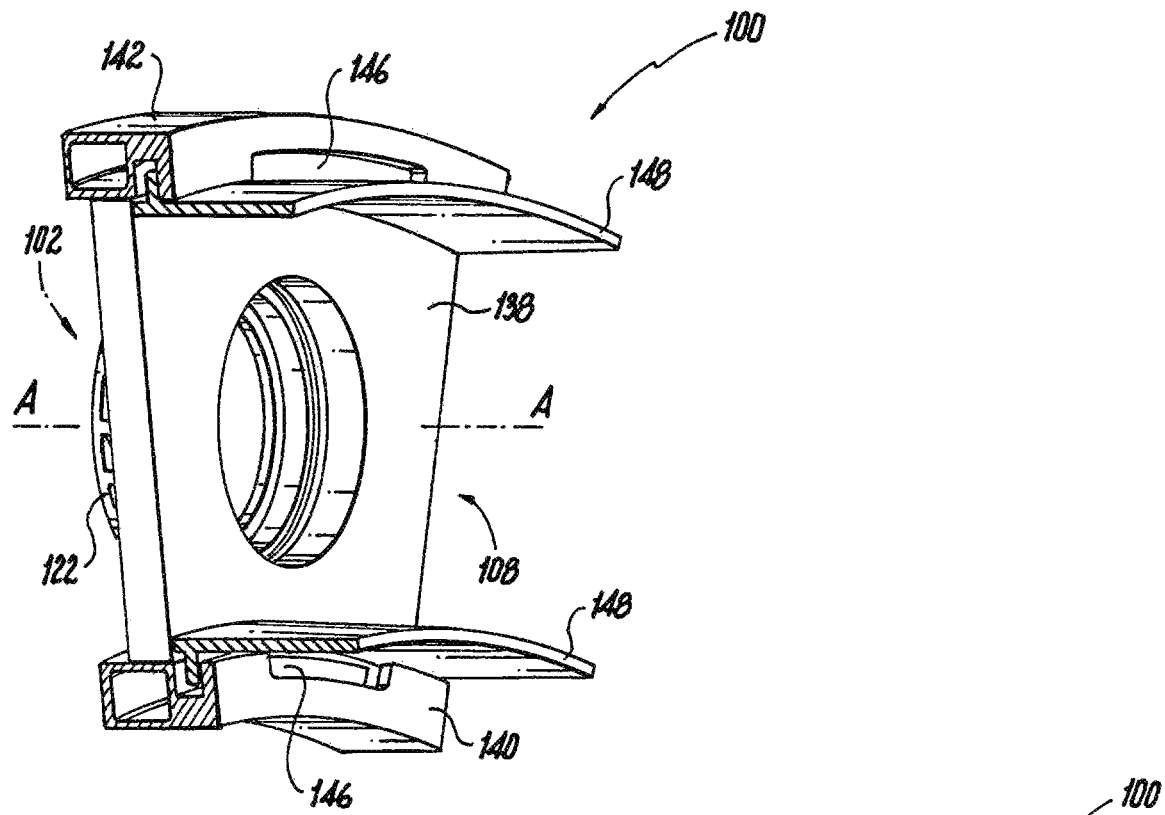
FIG. 1 is a perspective view of an exemplary embodiment of a nozzle constructed in accordance with the present disclosure, showing the manifold rings, heat shield, and bayonet features on the hot side of the nozzle.

Reference will now be made to the drawings wherein like reference numerals identify similar structural features or aspects of the subject disclosure. For purposes of explanation and illustration, and not limitation, a partial view of an exemplary embodiment of a nozzle in accordance with the disclosure is shown in FIG. 1 and is designated generally by reference character 100. Other embodiments of nozzles in accordance with the disclosure, or aspects thereof, are provided in FIGS. 2-10, as will be described. The systems and methods described herein can be used to atomize liquids, such as in atomizing fuel in a gas turbine engine.

Figure 2:
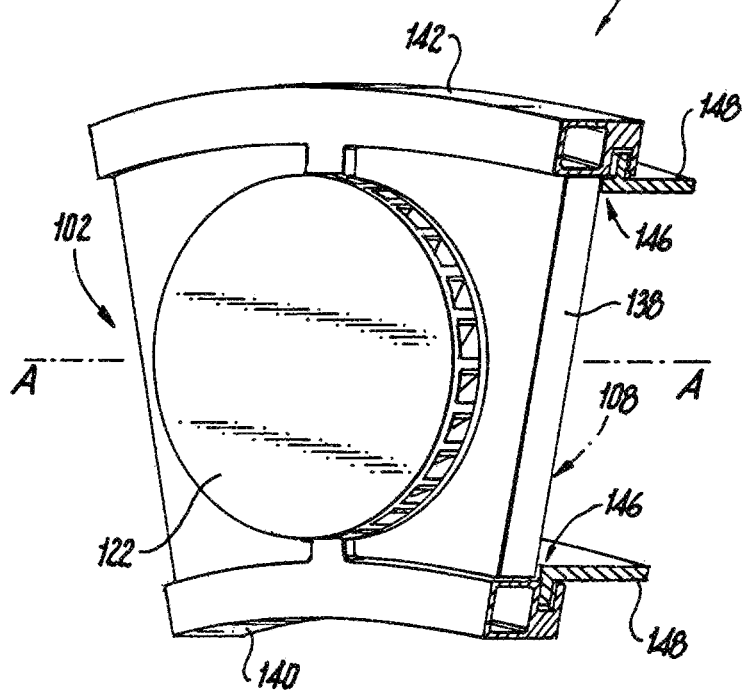
FIG. 2 is a perspective view of the nozzle of FIG. 1, showing the cold side of the nozzle.

Nozzle 100 includes a nozzle body 102 defining a liquid circuit 104 (identified in FIG. 3) extending from a liquid inlet 106 to a liquid outlet 108. Nozzle 100 is an assembly of components, one of which is the nozzle body 102, and other components of the assembly are descried herein below. FIG. 1 shows nozzle 100 from a downstream, hot side, e.g., from within a combustor into which nozzle 100 issues a spray of fuel. FIG. 2 shows nozzle 100 from an upstream cold side, e.g., from within a compressor that supplies pressurized air through nozzle 100 for combustion in on the hot side.

Figure 3:
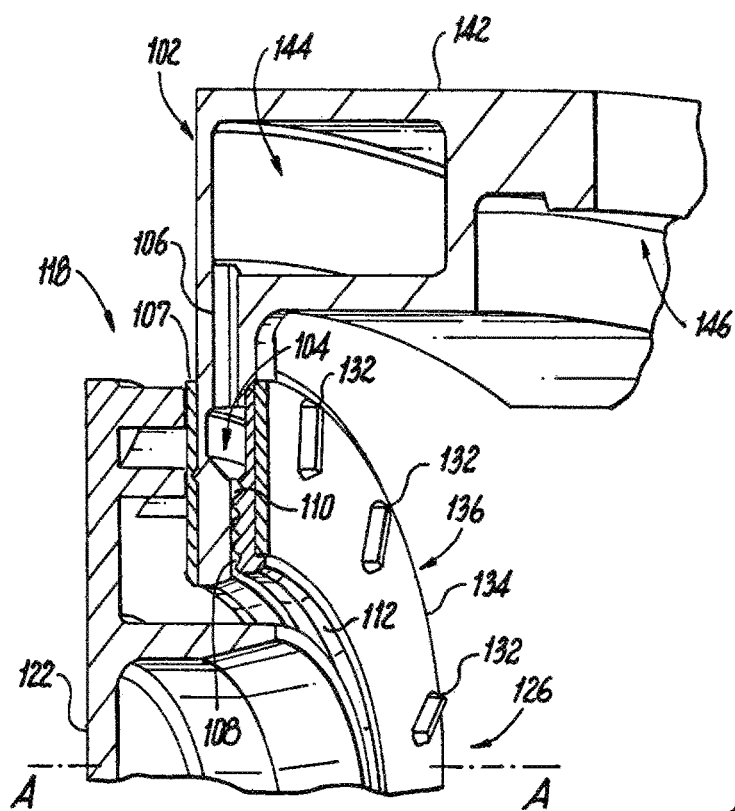
FIG. 3 is a cross-sectional perspective view of a portion of the nozzle of FIG. 1, showing the liquid swirler and showing the outer air circuit with the heat shield removed.

With reference to FIG. 3, the liquid circuit 104 includes a plurality of grooves for spiral liquid passages 110 spiraling radially inward relative to a spray axis A. Each of the spiral liquid passages lies in a plane P normal to the spray axis A. Plane P is identified in FIG. 4. Those skilled in the art will readily appreciate that while all of the spiral liquid passages 110 are defined in a common plane P, it is also possible for each spiral liquid passage to be defined in a separate respective plane perpendicular to the spray axis A without departing from the scope of this disclosure. An upstream heat shield 107 is mounted to an upstream portion of nozzle body 102.

Figure 4:
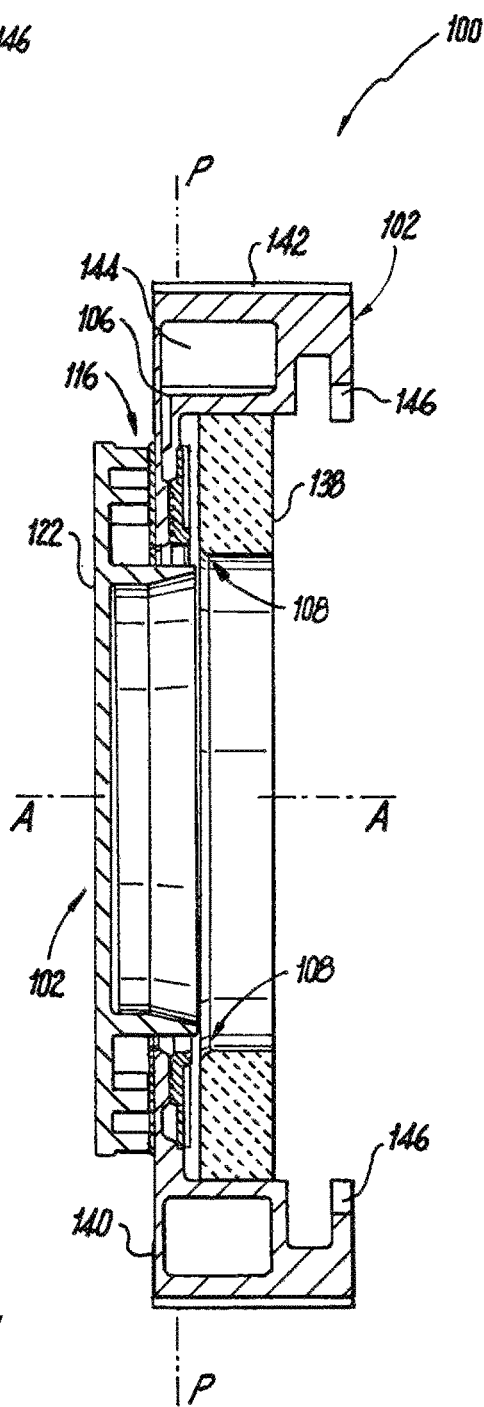
FIG. 4 is a cross-sectional side elevation view of the nozzle of FIG. 1, showing the radial air swirler assembled onto the nozzle body.
Figure 5:
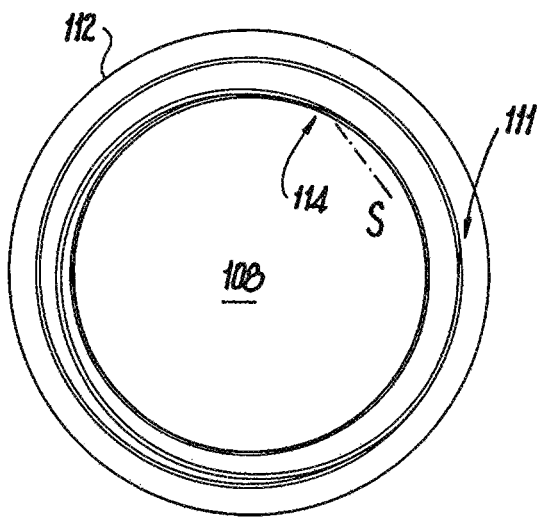
FIG. 5 is a perspective view of a the liquid swirler of FIG. 3, schematically showing one of the spiral liquid passages.
Figure 6:
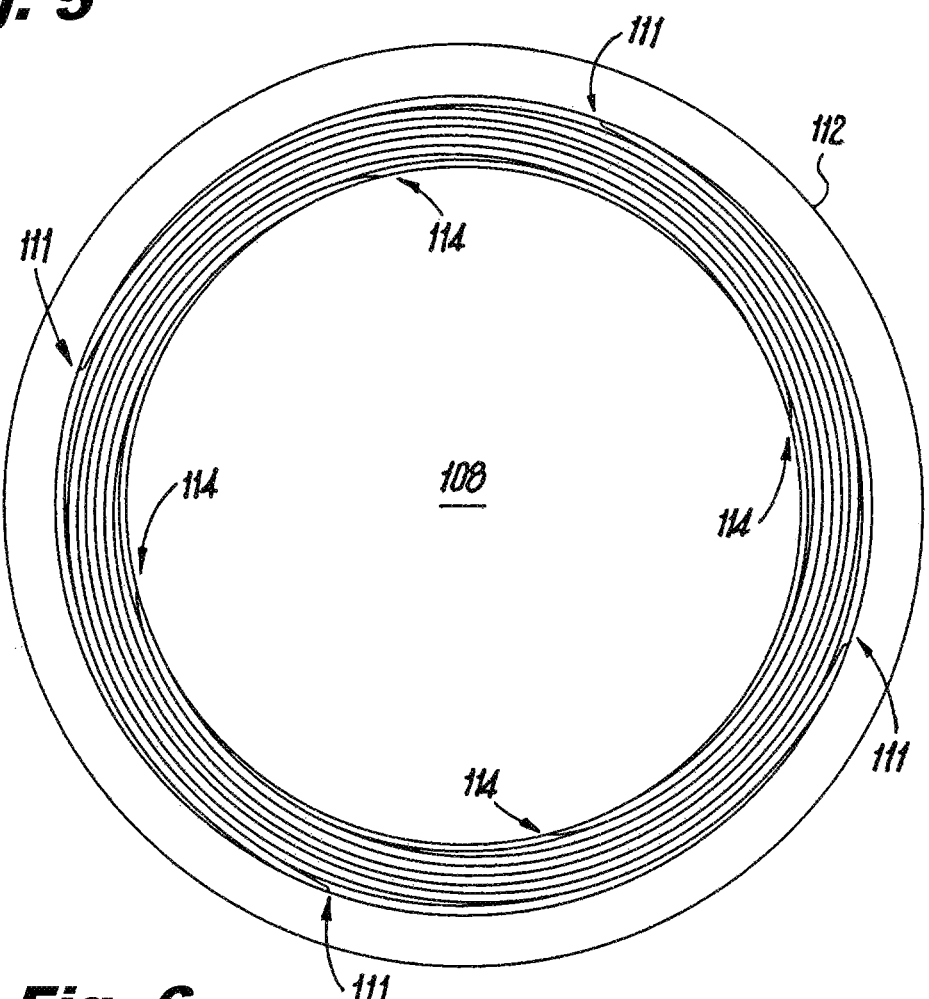
FIG. 6 is a perspective view of a portion of the nozzle of FIG. 1, showing the liquid swirler.
Figure 7:
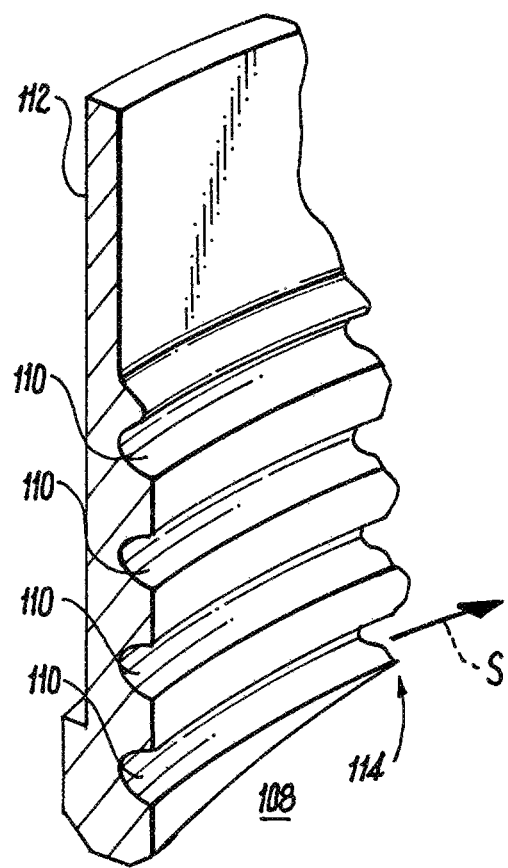
FIG. 7 is a cross-sectional perspective view of a portion of the liquid swirler of FIG. 6, showing one of the outlet orifices.

With reference now to FIG. 5, the spiral liquid passages 110 are defined on an annular liquid swirler 112. FIG. 5 only shows one of the spiral liquid passages 110, but FIGS. 6 and 7 show four spiral liquid passages 110. Each spiral liquid passage 110 defines a respective inlet 111 and an outlet orifice 114 of the liquid outlet 108. Each outlet orifice 114 defines an orifice axis S that is has a tangential component relative to the spray axis A and lies in the plane P normal to the spray axis A (spray axis A and plane P are shown in FIG. 4). The angle of spray axis S relative to a true tangent about axis A is somewhat exaggerated in FIGS. 5 and 7 for sake of clarity, as spray axis S is nearly tangential to a circumferential direction about axis A (which is identified in FIG. 4). The swirl direction induced on liquid issuing from outlet orifices 114 is indicated by the larger arrow in FIG. 7. There can be more than four passages 110 depending on the diameter of the nozzle. In many applications, one exit occurs every 1 to 1.5 inches (2.54 to 3.81 cm) around the liquid swirler 112. One of the benefits of these passages 110 is they provide a certain resistance to the liquid flow due to friction. They can be relative large (e.g. greater than 0.020 inches or 0.0508 cm) in flow area which is desired to avoid flow blockage but provide sufficient resistance based on length to divide the flow uniformly around the circumference. The relatively long length helps in cooling the wetted surface of the liquid swirler 112 despite it being immersed in substantial hot, flowing air.

With reference now to FIG. 8, the nozzle body 102 includes an inner air circuit 116 passing inboard of the liquid outlet 108. The inner air circuit 116 extends radially inward from an inlet 118 thereof and turns in an axial direction, parallel with axis A in FIG. 4, to an outlet 120 thereof radially inboard of the liquid outlet 108. A radial air swirler 122 is mounted to the nozzle body 102. As shown in FIG. 9, radial air slots 124 are defined in the radial air swirler 122 to define an inlet 118 of the inner air circuit 116 shown in FIG. 8. The inner air circuit 116 and liquid circuit are in a co-swirling configuration, i.e. both circuits swirl in the same direction, however those skilled in the art will readily appreciate that any other suitable configuration can be used, including counter-swirling, without departing from the scope of this disclosure. Mixing therefor occurs in a very thin sheet at the exit of nozzle 100.

With continued reference to FIG. 8, the nozzle body 102 can include an outer air circuit 126 passing outboard of the liquid outlet 108. The outer air circuit 126 extends radially inward from an inlet 128 thereof and can turn in an axial direction, parallel to axis A shown in FIG. 4, to an outlet 130 thereof radially outboard of the liquid outlet 108. As shown in FIG. 3, the nozzle body 102 includes a plurality of spacers 132 extending from an annular face 134 of a downstream heat shield 136 of the nozzle body 102. The spacers 132 extend in a parallel direction to the spray axis A of FIG. 4. As shown in FIG. 8, a main heat shield 138 is mounted to the nozzle body 102 on a downstream face thereof, spaced apart from the nozzle body 102 by the spacers 132 (shown in FIG. 3), wherein the outer air circuit 128 is defined between the nozzle body 102, spacers 132, and heat shield 138. The spacers 132 define a non-tangential flow path for non-swirling issue of air through the outer air circuit 126. Inner and outer air circuits 116 and 128 sandwich the liquid from circuit 104 therebetween and shear the liquid for atomization. It is contemplated that the ratio of air flow can range from 50:50 to 40:60 inner to outer air flow, or any other suitable ratio. In an embodiment the nozzle body 102 comprises radial air swirler 122, upstream heat shield 107, liquid swirler 112, and downstream heat shield 136, which could be made as one additively manufactured component, or could be assembled as separate comments joined together.

With reference again to FIG. 4, nozzle body 102 includes an inner manifold ring segment 140 and an outer manifold ring segment 142, wherein outer ring segment 142 includes a liquid manifold passage 144 in fluid communication with the liquid inlet 106 of the liquid circuit 104. Inner ring segment 140 can optionally provide a similar liquid manifold passage, e.g., for multiple spray circuits or the like. Both the ring segments 140 and 142 include a bayonet features 146 configured to receive a corresponding bayonet feature of a combustor wall or combustor sliding support 148, shown in FIG. 1.

With reference now to FIG. 10, a manifold assembly 150 includes a plurality of nozzles 100 as described above. An outer manifold ring 152, made up of outer ring segments 142 of the respective nozzles 100, is in fluid communication with the liquid inlet 106 of each of the nozzles 100 to deliver liquid to the nozzles 100. The outer ring segments 142 are continuous with one another to form a continuous manifold ring 152. The nozzles 100 are circumferentially spaced apart around the manifold ring 152.

Assembly 150 includes an inner manifold ring 154, e.g. made up of inner ring segments 140 of the respective nozzles 100. The fuel nozzles 100 extend radially between the first and second manifold rings 152 and 154. Each manifold ring 152 and 154 can include bayonet features 146 as described above. Inner manifold ring 154 in the example shown in FIG. 10 is segmented as a stiffener ring, and is not therefore used for fuel manifolding. This accommodates thermal growth and shrinking of the nozzles 100 and outer manifold ring 152 relative to inner manifold ring 154. Outer ring 152 and nozzles 100 can be manufactured as a single integral component, e.g., using additive manufacturing. The heat shields 138 (shown in FIGS. 1 and 2) tile together to define an upstream combustor dome wall 156 (for sake of clarity only some of the heat shields 138 are shown tiled together in FIG. 10). Due to the tiling of wall 156, the inner and outer air circuits 116 and 126 (shown in FIG. 8) are the only pathway for air to pass through the combustor dome wall 156.

Potential advantages of nozzles and assemblies as described herein include elimination of bulk compared to conventional nozzles, e.g. with fuel passages defined in conical geometries. This very compact (flat) design does not take up much axial length and can reduce the axial length of the engine (shafts, case, and the like) saving substantial weight as well as reduce drag on the engine nacelle. Fuel can be distributed in a relatively large diameter using a serpentine distributor, e.g., liquid swirler 112. Air that is admitted as part of the nozzle can also be used to cool the backside of the combustor, e.g., the cold side of nozzles 100, before it enters the combustor. An internal fuel manifold, e.g., in the manifold rings 152 and 154, can reduce weight and eliminate numerous holes in the combustor case used for traditional fuel injectors to access the interior of the combustor case. Light weight ceramic matrix composite (CMC) materials can be advantageously used in the construction of the major elements.

The methods and systems of the present disclosure, as described above and shown in the drawings, provide for liquid injection with superior properties including compactness, light weight, and advantageous spray patternation. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A nozzle comprising:
   a nozzle body defining a liquid circuit extending from a liquid inlet to a liquid outlet, wherein the liquid circuit includes at least one spiral liquid passage spiraling radially inward relative to a spray axis, wherein each of the at least one spiral liquid passages lies in a plane normal to the spray axis, wherein each of the at least one spiral liquid passage defines a respective outlet orifice of the liquid outlet, wherein each outlet orifice defines an orifice axis that is tangential relative to the spray axis and lies in the plane normal to the spray axis, wherein a radial cross-section through the nozzle body, relative to the spray axis, cuts through all spiral liquid passages, namely a cross-section as viewed in a cross-sectional side-elevation view, viewing toward the spray axis, which runs in a direction going across the view, wherein each spiral liquid passage is defined in and issues from a plane perpendicular to the spray axis into a respective air passage that follows a path parallel to the spray axis.

2. A nozzle as recited in claim 1, wherein the nozzle body includes an inner air circuit passing inboard of the liquid outlet.

3. A nozzle as recited in claim 2, wherein the inner air circuit extends radially inward with a tangential swirl from an inlet thereof and turns in an axial direction to an outlet thereof radially inboard of the liquid outlet.

4. A nozzle as recited in claim 2, further comprising a radial air swirler mounted to the nozzle body, wherein radial air slots defined in the radial air swirler define an inlet of the inner air circuit.

5. A nozzle as recited in claim 2, wherein the inner air circuit and liquid circuit are in a co-swirling configuration.

6. A nozzle as recited in claim 1, wherein the nozzle body includes an outer air circuit passing outboard of the liquid outlet.

7. A nozzle as recited in claim 6, wherein the outer air circuit extends radially inward from an inlet thereof and turns in an axial direction to an outlet thereof radially outboard of the liquid outlet.

8. A nozzle as recited in claim 1, wherein the nozzle body includes inner and outer manifold ring segments, wherein at least one of the ring segments includes a liquid manifold passage in fluid communication with the liquid inlet of the liquid circuit.

9. A nozzle as recited in claim 8, wherein at least one of the ring segments includes a bayonet feature configured to receive a corresponding bayonet feature of a combustor wall or combustor sliding support.

10. A nozzle comprising:
    a nozzle body defining a liquid circuit extending from a liquid inlet to a liquid outlet, wherein the liquid circuit includes at least one spiral liquid passage spiraling radially inward relative to a spray axis, wherein each of the at least one spiral liquid passages lies in a plane normal to the spray axis, wherein a radial cross-section through the nozzle body, relative to the spray axis, cuts through all spiral liquid passages, namely a cross-section as viewed in a cross-sectional side-elevation view, viewing toward the spray axis, which runs in a direction going across the view, wherein the nozzle body includes an outer air circuit passing outboard of the liquid outlet, wherein the nozzle body includes a plurality of spacers extending from an annular face of the nozzle body in a parallel direction to the spray axis, and further comprising a heat shield mounted to the nozzle body, spaced apart from the nozzle body by the plurality of spacers, wherein the outer air circuit is defined between the nozzle body, the plurality of spacers, and heat shield, wherein each spiral liquid passage is defined in and issues from a plane perpendicular to the spray axis into a respective air passage that follows a path parallel to the spray axis.

11. A nozzle as recited in claim 10, wherein the spacers define a non-tangential flow path for non-swirling flow of air through the outer air circuit.

* * * * *